March 28, 1967 G. S. MITTELSTAEDT 3,311,097
HYDROGEN-OXYGEN DEVICE IN COMBUSTION ENGINES
Filed Nov. 24, 1964 4 Sheets-Sheet 1

INVENTOR
Georg Mittelstaedt

March 28, 1967 G. S. MITTELSTAEDT 3,311,097
HYDROGEN-OXYGEN DEVICE IN COMBUSTION ENGINES
Filed Nov. 24, 1964 4 Sheets-Sheet 2

INVENTOR
George Mittelstaedt

March 28, 1967     G. S. MITTELSTAEDT     3,311,097

HYDROGEN-OXYGEN DEVICE IN COMBUSTION ENGINES

Filed Nov. 24, 1964     4 Sheets-Sheet 3

*INVENTOR.*

George Mittelstaedt

United States Patent Office 3,311,097
Patented Mar. 28, 1967

3,311,097
HYDROGEN-OXYGEN DEVICE IN
COMBUSTION ENGINES
Georg S. Mittelstaedt, 274 73rd St.,
Brooklyn, N.Y. 11209
Filed Nov. 24, 1964, Ser. No. 413,505
4 Claims. (Cl. 123—119)

This invention relates to internal combustion engines, to electric cells and to storage batteries. It also relates to methods and apparatus for producing hydrogen and oxygen gases in an electric cell or battery for use in the intake, combustion and exhaust zones of a combustion engine.

In the text and claims, by "battery" or "cell" is meant any electrolytic device which decomposes water, liberating hydrogen and oxygen gases at the electrodes.

The liberated hydrogen and oxygen gases are introduced into the combustion zone of the engine as a fuel, or the gases are introduced into the intake line of the engine to combine with the intake air, or fuel, or a mixture thereof, to enrich and improve the charge, to promote combustion, to produce less toxic combustion products, to increase power, to increase the efficiency of the engine, and/or to economize on fuel.

The liberated gases may also be introduced directly into the cylinders or combustion zone of the engine for promoting combustion; or they may be introduced into the exhaust zone of the engine, which may include an afterburner zone, to burn hydrogen and oxygen in the afterburner, to promote combustion, to use up unburned exhaust gases, to produce or increase thrust, and/or to convert, purify or neutralize the combustion products, at least in part, tending to render them less toxic. In the text and claims, by "afterburner" is meant any flame zone downstream of the cylinders or primary combustion chamber.

The device may also be used to secure a cooling effect in the battery.

Other objects are simplicity, low initial cost, low operating cost, ease and simplicity of installation and ease of maintenance.

These and other objects will become apparent in the description below, in which characters of reference refer to like-named parts in the drawing.

A large class of piston-type engines, including automobile and aircraft engines, operate on a premixed charge of fuel vapor and air. In these and in some other engines the charge is ignited by passing a high-voltage current between the electrodes in the combustion chamber.

The usual ignition system in these engines essentially comprises a generator, a voltage regulator, a battery, an ignition switch, an ignition coil and a distributor, and the principle is well known.

The present invention particularly relates to the battery or any electric cell as related to the decomposition of water, and the use of the liberated hydrogen and oxygen gases in the combustion engine.

Basically, the automobile and other batteries are electrolytic devices, and in these devices an electric current breaks down the water into its two elements, hydrogen and oxygen. The conventional lead-acid storage battery usually consists of 3 or 6 cells, each cell comprising a container filled with dilute sulphuric acid in which a set of positive and negative plates are immersed, plate separators, a cover, a filling opening and a vent plug; then there are cell connectors and terminal posts. The generator produces the charging current.

The portion of the current passing through the electrolyte decomposes the water, which is composed of two parts hydrogen and one part oxygen. It has been found that 96,500 amp.-sec. of current produce 11,200 cc. of hydrogen and 5,600 cc. of oxygen per cell. The gases being evolved are explosive, and it is well known that mixtures of hydrogen and oxygen explode violently if they are ignited by a spark. The automobile-battery gases also frequently contain traces of antimony compound, stibine, which burns with a bluish-green flame.

In this invention, the liberated hydrogen and oxygen gases are conveyed e.g. pumped through a tube from the battery into the intake line or into the combustion zone of the engine for combustion or for promoting combustion, or the gases may be pumped into the afterburner zone chiefly to promote combustion therein, to use up unburned combustion gases, to convert some of the combustion gases, and in some cases to produce or increase thrust, or the gases may be pumped into the flameless portion of the exhaust zone to purify and neutralize the exhaust at least partially and render it less toxic.

In the text and claims, by the noun or verb "pump" is meant any means, including pressure and/or suction means, moving the battery gases through a tube into the combustion line intake-combustion-exhaust line of the engine; by "intake-combustion-exhaust line" is meant any part or all thereof; by "intake line" is meant any part thereof upstream of the cylinders or combustion chamber; by "exhaust line" is meant any part thereof downstream of the cylinders or combustion chamber, by "electric generator" is meant any device or means producing electricity.

The regular battery and generator of a combustion engine may be used in this invention, or an extra, separate electrolytic cell or battery may be utilized which may be connected to the regular electric generator or to a different source of electricity; or both the regular battery and an extra cell may be used to produce hydrogen and oxygen gas for use in the intake-combustion-exhaust line of the engine. Such separate cell may be any primary or secondary cell or battery in which hydrogen and oxygen gases are liberated, and such cell or battery may or may not have an outside source of electricity. The cells or batteries may also produce other gases or substances besides hydrogen and oxygen.

The liberated hydrogen and oxygen gases may be used together, as above described, or these gases may be used separately and are perhaps piped to different parts of the intake-combustion-exhaust line, or only one of the gases may be used. Oxygen is very reactive, having the property of combining with other substances, and so is hydrogen. Either gas is a supporter of combustion, and either gas will convert, neutralize or purify the combustion products, at least in part.

When in this invention the hydrogen and oxygen gases are not used together, an electrolytic apparatus is used in which the liberated hydrogen and oxygen are separated. In such devices the cells are usually constructed with asbestos diaphrams or other means to keep the gases separated, or the cells may have bell-jars or hoods to serve this purpose. Such devices are well known.

This invention may be used in connection with any type combustion engine, and it essentially comprises producing hydrogen and oxygen gases in electric cells or batteries and pumping both gases, or at least one of the gases into the combustion line of the engine.

The drawing is illustrative only, and the invention is not limited to the particular examples illustrated.

Referring briefly to the drawing, FIG. 1 is a plan view showing a battery, a generator or other electric source, and tubes leading from the battery to the intake line of a combustion engine, showing an application of the invention.

FIG. 2 indicates a cross-section through an electric cell and a tube leading from the cell to the intake-combustion-exhaust line of the engine.

Figure 5:
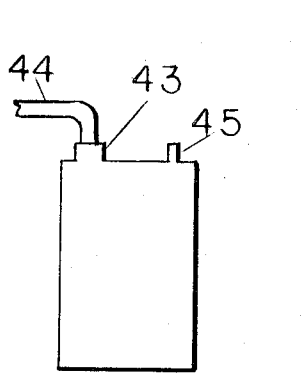

FIG. 5 indicates an electric cell with a tube for conveying the liberated hydrogen and oxygen gases to the intake-combustion-exhaust line of the engine, and an air inlet in the cell cover.

Figure 6:
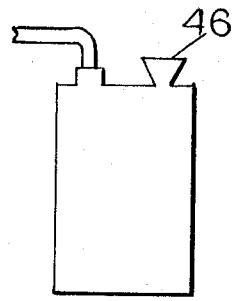

FIG. 6 is similar to FIG. 5, but the air inlet expands outwards.

Figure 7:
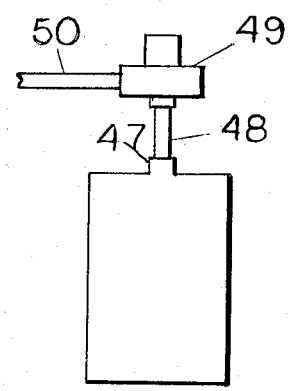

FIG. 7 shows an electric cell and a motor driven pump to force the liberated hydrogen and oxygen gases into the intake-combustion-exhaust line of the engine.

Figure 8:
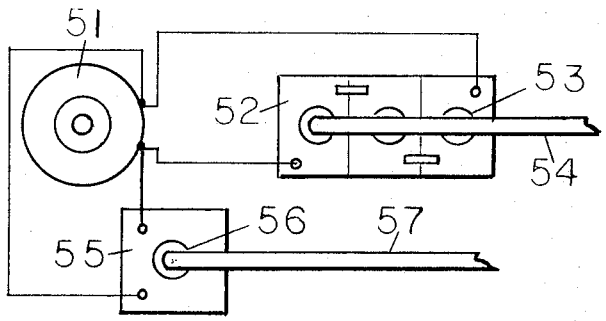

FIG. 8 shows a battery and an extra electric cell, and tubes leading from both battery and extra cell to the intake-combustion-exhaust line of the engine.

Figure 9:
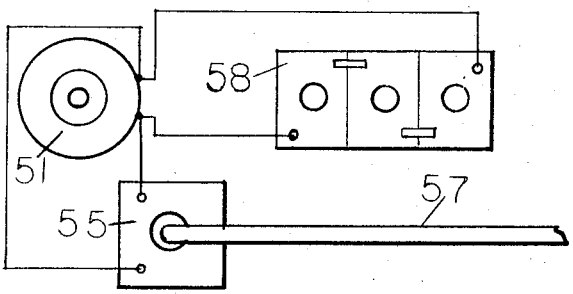

FIG. 9 is similar to FIG. 8, but here only the extra-cell gases are piped to the intake-combustion-exhaust line.

Figure 10:
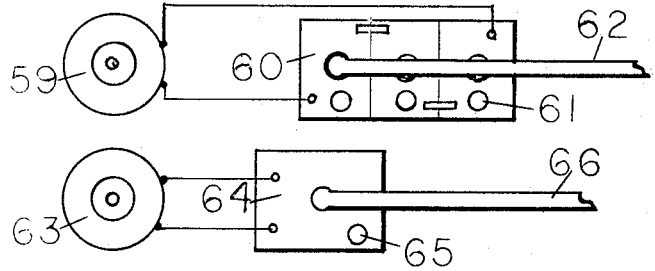

FIG. 10 shows an electric generator connected to a battery, a tube leading from the battery to the combustion line of the engine, an extra generator connected to an extra electric cell, and a tube leading from the extra cell to the intake-combustion-exhaust line of the engine.

Figure 11:
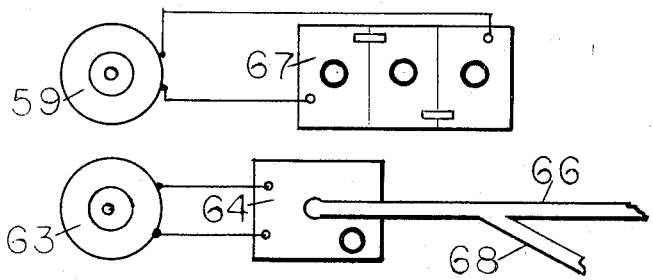

FIG. 11 is similar to FIG. 10, but here only the extra generator-extra cell gases are piped to the intake-combustion-exhaust line of the engine.

Figure 12:
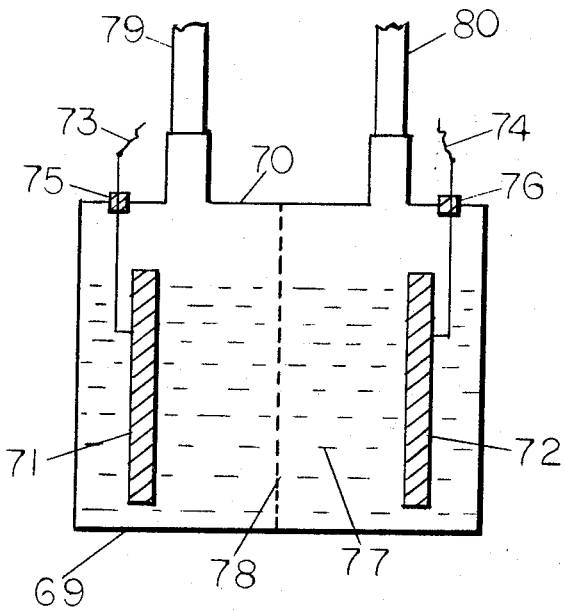

FIG. 12 shows an electric cell with separate tubes conveying the oxygen and hydrogen gases to the intake-combustion-exhaust line of the engine.

Figure 13:
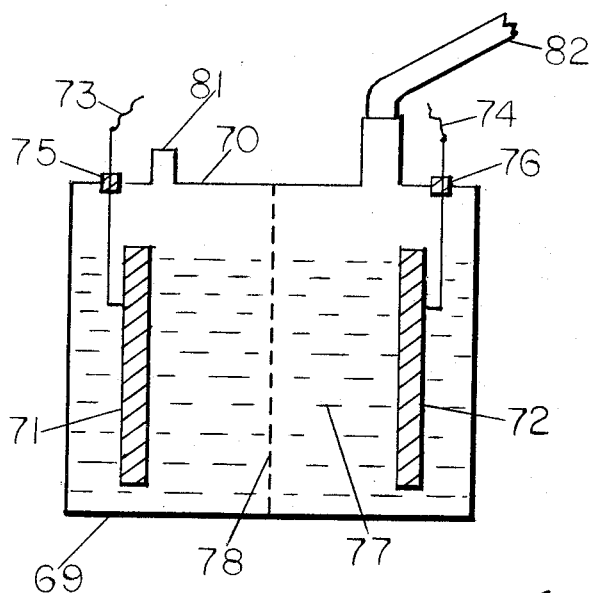

FIG. 13 indicates an electric cell in which the gas liberated at one electrode is conveyed to the intake-combustion-exhaust line of the engine.

Figure 1:
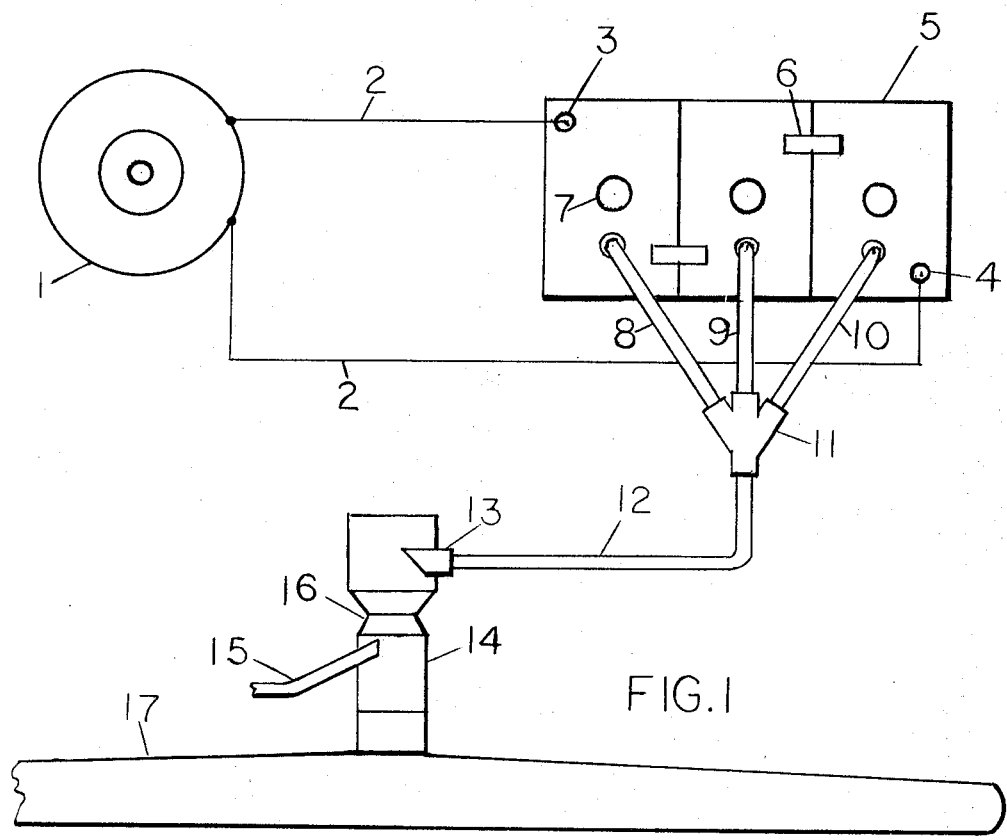

Referring in detail to the drawing, the numeral 1 in FIG. 1 indicates a generator or other electric source connected with line 2 to the terminal posts 3 and 4 of a 3-cell battery. Each cell comprises a container filled with an electrolyte and a set of positive and negative plates, not shown. The numeral 6 shows cell connectors and 7 indicates filling openings and removable plugs, perhaps with inlet openings, not shown. The numerals 8, 9 and 10 indicate tubes communicating with the spaces over the plates beneath the cell covers and leading to a collector device or manifold 11 which is connected with tube 12 and perhaps suction tube 13 to the air inlet of the carburator 14. The carburator has a fuel jet 15, a venturi 16 and the usual choke and throttle valves, not shown, and is connected to the intake manifold 17 of a piston-type combustion engine, also not shown.

The intake of the pistons within the cylinders of the engine will cause a draft through the intake line, which includes the carburator, and will also cause a suction effect through the tube arrangement 8 to 12. In the text and claims, by "tube" is also meant duct, channel, passage, collective tubes etc. The tube 12 may lead directly to the intake line of the engine, e.g., the air intake of the carburator with or without entering, or it may lead to a suction tube 13 which may be provided to increase the suction effect.

The liberated hydrogen and oxygen gases are drawn from the battery into the carburator, and from there into the cylinders. The liberated gases may also tend to spread and move through the tubes partly on their own. In the carburator, the battery gases will enrich the air-fuel mixture and will produce a highly combustible vapor, which will increase the efficiency of the engine.

The tube 12 may also lead to the venturi of the carburator, perhaps to a point immediately downstream of the venturi throat, or may lead to any part of the intake line for enriching the air and fuel mixture. The tube 12 may also be branched and connect to several parts of the intake line.

If the filler plugs close the filling openings tightly, and if there is no air inlet into the battery either through the plugs or otherwise, then suction and perhaps the natural tendency to spread will move the liberated gases from the battery through the tubes to the intake line of the engine. If the filler plugs have air inlets, or if the battery has other air inlets or means of ingress, then atmospheric pressure will also tend to force the liberated gases into the intake line of the engine. By "filler plug" is meant filling-opening plug or cap.

Figure 2:
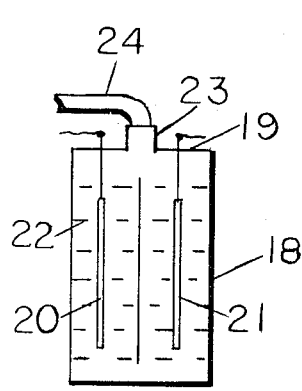

FIGURE 2 is a cross-section of an electric cell in which the numeral 18 indicates the container, 19 the cell cover, 20 and 21 the positive and negative plates or electrodes, and 22 the electrolyte. The numeral 23 indicates an opening or tube in the cell cover communicating with the space over the plates or electrodes beneath the cover, and 24 indicates a tubes conveying the liberated gases to the intake-combustion-exhaust line of the engine. The tube 24 may be branched, not shown, separate branches perhaps leading to separate cylinders of the engine.

Figure 3:
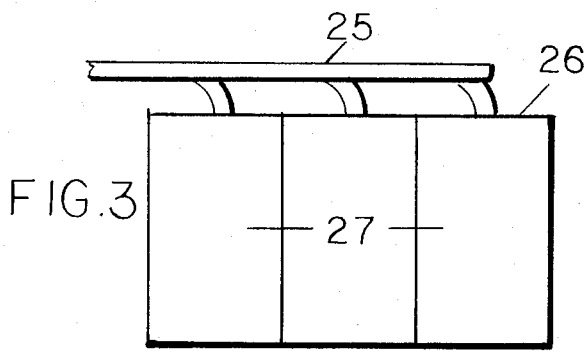
FIG. 3 shows a manifold on the battery cover, communicating with the cells and leading to the intake-combustion-exhaust line of the engine.

FIG. 3 shows a manifold 25 extending through the cell covers 26 of a 3-cell battery 27. The manifold communicates with the gases over the plates beneath the cell covers, collecting the liberated gases and conveying them to the intake-combustion-exhaust line of the engine.

Figure 4:
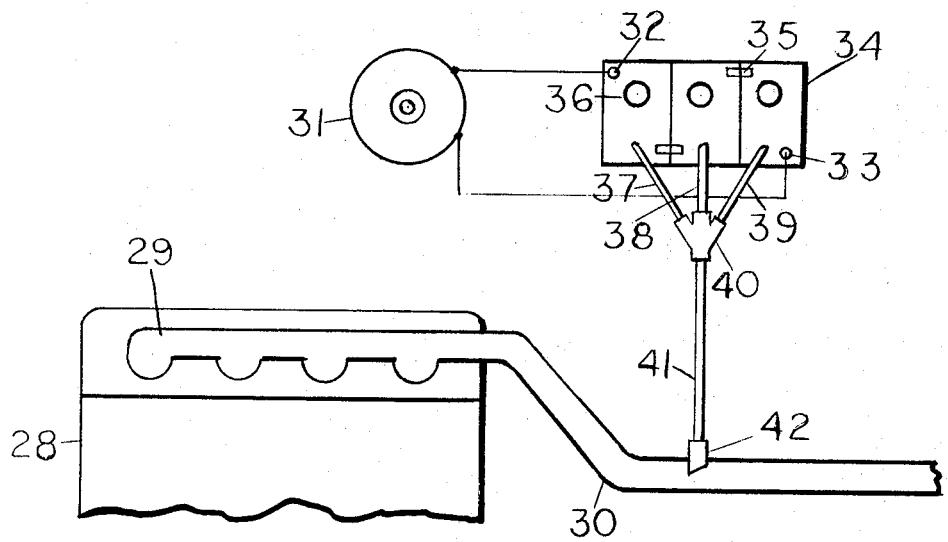
FIG. 4 is a plan view showing a battery, a generator or other electric source, and tubes leading from the battery to the exhaust line of the combustion engine.

In FIG. 4 the numeral 28 indicates a piston type combustion engine, having an exhaust manifold 29 and an exhaust tube 30. The numeral 31 indicates an electric generator or other source of electricity connected to the terminal posts 32 and 33 of a 3-cell battery 34. The numeral 35 indicates the cell connectors and 36 indicates filling openings and removable plugs which may or may not have inlet openings. The numerals 37, 38 and 39 indicate tubes communicating with the spaces over the battery plates beneath the cell covers, and leading to a collector device or manifold 40 which is connected with tube 41 and perhaps suction tube 42 to the exhaust line of the combustion engine.

The suction tube 42 produces a low pressure area for drawing the liberated battery gases into the exhaust line, and the suction tube 42 may be disposed in any part of the exhaust line. The liberated gases may also tend to spread and move through the tubes partly on their own. Any other means may be provided in the exhaust line, perhaps a venturi, not shown, for producing a low pressure area, and the tube 41 may be connected thereto, to draw the liberated hydrogen and oxygen gases into the exhaust line.

It is to be noted that any type pump or any other means may be utilized to force the battery gases into the exhaust line of the combustion engine. The tube 41 may also be branched and connect to several parts of the exhaust line.

If the tube 41, perhaps in connection with suction tube 42, is connected to an afterburner zone, the hydrogen and oxygen gases will aid combustion and perhaps tend to increase thrust, which latter feature is especially important in connection with airplanes. The more complete after-burning and possibly a partial conversion of the combustion products will also result in a cleaner and less toxic exhaust. If the line 41, perhaps in connection with suction tube 42, is connected to the portion of the exhaust tube downstream of the afterburner zone, then the liberated gases will primarily tend to purify and/or neutralize the exhaust gases, at least in part, and tend to render the exhaust less toxic.

FIG. 5 shows an electric cell which decomposes water, liberating hydrogen and oxygen. The numeral 43 indicates an opening or tube in the cover of the cell communicating with the space over the plates beneath the cover. The numeral 44 indicates a tube conveying the liberated gases to a pressure area in the intake-combustion-exhaust line below atmospheric, and 45 indicates an air inlet into the cell, also communicating with the space over the plates beneath the cover, the atmospheric pressure tending to force the liberated hydrogen and oxygen gases into said low pressure area.

FIG. 6 is similar to FIG. 5, but the air inlet 46 expands outwards to increase the air-intake area.

FIG. 7 indicates an electric cell which decomposes water, liberating hydrogen and oxygen. The numeral 47 indicates an opening or tube in the cover of the cell communicating with the space over the plates beneath the cover, and 48 indicates a tube leading to a pump 49 which pumps the liberated hydrogen and oxygen gases through tubes 48 and 50 into the intake-combustion-exhaust line of the engine.

In FIG. 8, the numeral 51 indicates an electric generator connected to the terminal posts of an electric battery 52. The numeral 53 indicates filling openings and vented plugs covering the openings, and 54 indicates tube means leading from the vents in the filler plugs to any part of the combustion line of the engine. The electric generator 51 is also connected to the terminal posts of an extra electric cell 55 for the decomposition of water. The numeral 56 indicates a filling opening in the cell and a vented plug, and 57 indicates a tube leading from the vent in the filler plug to the intake-combustion-exhaust line of the engine.

In FIG. 9, the arrangement is similar to that of FIG. 8, but here the battery is for regular automotive use only. The extra cell 55 is connected with tube 57 to any part of the intake-combustion-exhaust line of the engine.

In FIG. 10, an electric generator 59 is connected to an electric battery 60. The numeral 61 indicates filling openings and filler plugs, and 62 indicates tube means leading from vents in the battery to any part of the combustion line of the engine. The vents communicate with the spaces in the battery cells over the electrodes beneath the cell covers. An extra electric generator 63 is connected to an extra water decomposition cell 64 which has a filling opening and plug 65, and a tube 66 leading from a vent in the cell cover to a different part of the intake-combustion-exhaust line of the engine than tube means 62. The vent communicates with the space over the electrodes beneath the cell cover.

FIG. 11 is similar to FIG. 10, but here the generator 59 and the battery 67 are for regular automotive use only. The extra generator 63 is connected to the extra water decomposition cell 64, and this cell is connected with tube 66 and perhaps branch tube 68 to the intake-combustion-exhaust line of the engine. For instance, the tubes 66 and 68 may lead to separate cylinders of the engine.

FIGURE 12 is a cross-section of an electric cell, in which the numeral 69 indicates the container, perhaps a metal container. The numeral 70 shows the cell cover, 71 and 72 indicate the positive and negative electrodes, and 73 and 74 indicate electric wires, leading through insulators 75 and 76 to an electric generator, not shown. The numeral 77 indicates the electrolyte, and 78 shows an asbestos diaphragm to keep the oxygen and hydrogen gases separated. The numerals 79 and 80 indicate separate tubes to convey the separate gases to the same or different parts of the intake-combustion-exhaust line of the engine. Suitable filler openings and plugs, not shown, may be provided.

FIGURE 13 is similar to FIGURE 12, and most parts have the same numerals. In FIGURE 13, the gas liberated at one of the electrodes is conveyed through tube 82 to any part of the intake-combustion-exhaust line of the engine. The gas liberated at the other electrode is vented through vent 81. The vent 81 may also serve as filler opening, or any other filler openings and plugs, not shown, may be provided.

The invention may be used in connection with piston type gas engines, diesel engines, gas turbines, jet engines, or any other suitable type of combustion engine; and the hydrogen and oxygen gases are produced in any suitable electric cell, battery or other apparatus by the decomposition of water. The liberated gases are conveyed into the intake line or into any other part of the intake-combustion-exhaust line of the engine as a fuel, to support combustion, and/or to tend to convert, neutralize or purify the combustion products, at least in part.

When charging a storage battery, the oxygen is liberated at the positive electrode and the hydrogen at the negative. When a lead-acid storage battery is not fully charged, the oxygen gases will be liberated at the anode before hydrogen is liberated at the cathode; but when the battery is fully charged, 1 part oxygen will be liberated at the anode and 2 parts hydrogen at the cathode. A small amount of copper will promote hydrogen evolution. It deposits on the negative plate. The amount tolerated in les than 0.01%. Of course, in cells especially made and used for the decomposition of water, the ratio of 2 parts hydrogen to 1 part oxygen can always be maintained.

Any mixture of hydrogen and oxygen will support combustion; but a mixture of 2 parts hydrogen and 1 part oxygen constitutes a suitable fuel. It is therefore especially to be noted that 2 parts hydrogen to 1 part oxygen is the ratio liberated in the fully charged lead-acid battery, and also is the ratio in the cells especially designed for decomposing water. This ratio also is an excellent supporter of combustion in connection with other fuels or unburned combustion products. Of course, the ratio used in the intake-combustion-exhaust line of the engine may be varied, or, as above described, the gases may be used separately, or only one of the gases may be used in the engine.

It is especially to be noted that the hydrogen-oxygen mixture gives no products of combustion except water.

It can be seen that in this invention the liberated battery gases are not discharged through vents into atmosphere, but are conveyed through a tube into the intake-combustion-exhaust line of the engine. Any pump or any means to this end may be utilized.

In the lead-acid battery and in some other batteries or cells, a filling opening is provided in the cell cover, the filling opening being fitted with a removable vent plug designed for the escape of gas into atmosphere; and some batteries have a no-vent plug to cover the filling opening and an extra safety fill vent to release the battery gases into atmosphere.

In contrast, in my device the liberated gases do not escape into atmosphere. They are conveyed to the intake-combustion-exhaust line of the engine; and in a simple form of this invention, a tube may lead from a vented filler plug, or from the vent in the plug to the intake-combustion-exhaust line of the engine, conveying the liberated gases thereto. In the text and claims, unless specifically designated, by "vent" is meant channel, passage, that is, either outlet or inlet. The normal tendency to spread or the pressure of the liberated gases may be enough to move the gases through the tube into the combustion line of the engine, but the device will probably be used in connection with suction means or any pump means. Also, the filler plugs may be omitted entirely, and tube means may lead the liberated gases from the filling openings to the intake-combustion-exhaust line of the engine.

In a battery with a non-vented filler plug and a safety fill vent, the safety vent may be connected with a tube to the intake-combustion-exhaust line of the engine; or in connection with such battery I propose to substitute the non-vented plug with a vented plug, resulting in two vents communicating with the liberated battery gases. One of the vents will be an outlet having a tube leading to a preferably low pressure area in the intake-combustion-exhaust line, the other vent being an inlet preferably subjected to atmospheric pressure.

Also, a filler plug may have two separate vents or channels, an inlet and an outlet, the outlet being connected to the intake-combustion-exhaust line of the engine and the inlet preferably communicating with atmosphere.

All these variations are part of this invention. Of course, there are many more possible modifications of this device, and they all are included in this invention as related to means conveying the liberated battery gases to the intake-combustion-exhaust line of the engine.

It is also to be noted that in this device, in connection with the described air inlet, air is circulated through the space above the cell plates beneath the cell cover, thereby providing a cooling effect in the cell or battery. This too forms part of this invention.

It is to be understood that fuel injection, or any other fuel system may be used in connection with this device, and this forms part of this invention.

It is to be noted that the devices and features illustrated and described are interchangeable, and that various changes may be made within the spirit or scope of the invention.

In the text and claims, by "suction tube" is meant any tube which produces suction or is part of a suction pump; by "inlet" is meant any means of ingress; by "outlet" is meant any means of egress; by "cover" is also meant filler plug or any other part forming the cell cover; by "engine" is meant internal combustion engine.

The principles involved in this invention may be applied to all fields of combustion as related to the use of battery gases in the combustion line of an engine.

I claim:

1. In a combustion engine having an intake-combustion-exhaust line and an electric system including a generator and a battery for normal automotive use, an extra electric generator connected to an extra electric cell comprising a vessel containing an electrolyte, positive and negative electrodes disposed in the electrolyte, a cell cover and a tube leading from the space over the electrolyte beneath the cell cover to any part of the intake-combustion-exhaust line of the engine; the electric current from the extra generator passing through the electrolyte in the extra electric cell decomposing water and liberating hydrogen and oxygen gases, said tube conveying the liberated gases to the intake-combustion-exhaust line of the engine.

2. In a combustion engine having an intake-combustion-exhaust line and an electric system, including an electric generator connected to an electric cell comprising a vessel containing an electrolyte and positive and negative electrodes disposed in the electrolyte, the electric current passing through the electrolyte decomposing water and liberating oxygen and hydrogen gases at the positive and negative electrodes respectively, separate tubes conveying the liberated oxygen and hydrogen gases to the intake-combustion-exhaust line of the engine.

3. In a system according to claim 2, separate tubes conveying the liberated oxygen and hydrogen gases to different parts of the intake-combustion-exhaust line of the engine.

4. In a combustion engine having an intake-combustion-exhaust line and an electric system, including an electric generator connected to an electric cell comprising a vessel containing an electrolyte and positive and negative electrodes disposed in the electrolyte, the electric current passing through the electrolyte decomposing water and liberating oxygen and hydrogen gases at the positive and negative electrodes respectively, a tube conveying the gas liberated at one of the electrodes to the intake-combustion-exhaust line of the engine.

References Cited by the Examiner

UNITED STATES PATENTS

| | | | |
|---|---|---|---|
| 1,280,982 | 10/1918 | Ford | 136—180 X |
| 1,363,889 | 12/1920 | Linebarger | 136—161 |
| 1,876,879 | 9/1932 | Drabold | 123—119 |
| 2,509,498 | 5/1950 | Heyl | 123—119 |
| 2,565,068 | 8/1951 | Drabold | 123—119 |
| 2,687,448 | 8/1954 | Gulick | 136—177 |
| 2,687,449 | 8/1954 | Gulick | 136—177 |
| 2,748,570 | 6/1956 | Booth | 60—97 |
| 2,988,589 | 6/1961 | Osborn | 136—179 |
| 3,012,088 | 12/1961 | Grady et al. | 136—180 X |
| 3,157,172 | 11/1964 | Mittelstaedt | 123—119 |

MARK NEWMAN, *Primary Examiner.*

KARL ALBRECHT, *Examiner.*

A. L. SMITH, *Assistant Examiner.*